(12) United States Patent
Ernst

(10) Patent No.: US 9,181,946 B2
(45) Date of Patent: Nov. 10, 2015

(54) LUBRICANT PUMP AND CONTROL PISTON

(75) Inventor: Jürgen Ernst, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 199 days.

(21) Appl. No.: 13/697,199

(22) PCT Filed: May 11, 2011

(86) PCT No.: PCT/EP2011/002330
§ 371 (c)(1),
(2), (4) Date: Jan. 15, 2013

(87) PCT Pub. No.: WO2011/141165
PCT Pub. Date: Nov. 17, 2011

(65) Prior Publication Data
US 2013/0129554 A1 May 23, 2013

(30) Foreign Application Priority Data

May 12, 2010 (DE) .......................... 10 2010 020 356

(51) Int. Cl.
F01C 1/18 (2006.01)
F01C 1/24 (2006.01)
F04C 14/18 (2006.01)
F01M 1/16 (2006.01)
F04C 2/18 (2006.01)
(Continued)

(52) U.S. Cl.
CPC .................. *F04C 14/18* (2013.01); *F01M 1/16* (2013.01); *F04C 2/18* (2013.01); *F04C 14/185* (2013.01); *F16J 1/006* (2013.01); *F16J 1/08* (2013.01); *F05C 2201/021* (2013.01); *F05C 2201/028* (2013.01); *F05C 2251/042* (2013.01)

(58) Field of Classification Search
CPC ......... F01M 1/16; F04C 14/18; F04C 14/185; F04C 2/18
USPC .......................... 418/21, 206.1–206.9; 92/248
See application file for complete search history.

(56) References Cited

U.S. PATENT DOCUMENTS 3,068,054 A * 12/1962 Schmidt et al. ................. 92/243
5,450,782 A * 9/1995 Hart et al. ................... 92/165 R
5,823,671 A * 10/1998 Mitchell et al. ............... 366/268
(Continued)

FOREIGN PATENT DOCUMENTS

DE 103 24 092 A1 12/2004
DE 10 2006 018 124 A1 10/2007
(Continued)

*Primary Examiner* — Hoang Nguyen
(74) *Attorney, Agent, or Firm* — Henry M. Feiereisen LLC

(57) ABSTRACT

A lubricant pump includes a housing in which at least one pair of intermeshing gear wheels is arranged for conveying lubricant. One gear wheel is rotatably supported on a drive shaft and the other gear wheel is rotatably supported on an axially shiftable displacement unit for adjusting a variable flow volume. Axially displaceable in a housing receptacle is a control piston for hydraulically adjusting the position of the displacement unit. The control piston is configured as composite structural part and has a central longitudinal shaft and cylinder rings which include control edges for clearing or closing control channels feeding into the receptacle. The cylinder rings are made from a material which reduces friction and/or wear with respect to the receptacle, and the central longitudinal shaft has at least one section made from a material having a coefficient of thermal expansion at least substantially corresponding to the one of the receptacle.

4 Claims, 2 Drawing Sheets

(51) Int. Cl.
*F16J 1/00* (2006.01)
*F16J 1/08* (2006.01)

(56) References Cited

U.S. PATENT DOCUMENTS

2005/0031467 A1* 2/2005 Caldwell ................. 417/395
2007/0248481 A1* 10/2007 Lamparski ............... 418/206.1
2011/0182760 A1   7/2011 Lamparski

FOREIGN PATENT DOCUMENTS

| DE | 10 2006 024 293 A1 | 12/2007 |
| JP | H07-180775 | 7/1995 |
| JP | H11-117034 | 4/1998 |
| JP | H10-192583 | 7/1998 |
| JP | 2000-170946 | 6/2000 |
| JP | 2006-194965 | 7/2006 |

* cited by examiner

LUBRICANT PUMP AND CONTROL PISTON

CROSS-REFERENCES TO RELATED APPLICATIONS

This application is the U.S. National Stage of International Application No. PCT/EP2011/002330, filed May 11, 2011, which designated the United States and has been published as international Publication No. WO 2011/141165 and which claims the priority of German Patent Application, Serial No. 10 2010 020 356.4, filed May 12, 2010, pursuant to 35 U.S.C. 119(a)-(d).

BACKGROUND OF THE INVENTION

The invention relates to a lubricant pump, in particular for a combustion engine of a motor vehicle, having a housing in which at least one pair of intermeshing gear wheels is arranged for conveying lubricant, with a first of the gear wheels being rotatably supported on a drive shaft and the second of the gear wheels being rotatably supported on an axially shiftable displacement unit for adjusting a variable flow volume, and a control piston axially displaceable in a receptacle of the housing for hydraulically adjusting the position of the displacement unit, with the control piston having a central longitudinal shaft and cylinder rings which include control edges for clearing or closing control channels feeding into the receptacle.

The invention also relates to a control piston for a lubricant pump, in particular as described above.

Lubricant pumps and control pistons of the afore-mentioned type are known from the prior art. In so-called variable capacity lubricant pumps, the feed volume is varied or adjusted by moving a gear wheel of a gear wheel pair. Due to the overlapping zone—seen axially—of the two gear wheels the volume being delivered is determined. The first gear wheel is hereby fixedly mounted on a drive shaft, whereas the second gear wheel is rotatably supported on the displacement unit. The displacement unit can be shifted or moved hydraulically axially in a known manner in order to change the axial position of the second gear wheel and thus the afore-mentioned overlapping zone. An axially movable control piston is provided for hydraulic actuation of the displacement unit and includes a central longitudinal shaft and a plurality of cylinder rings. The diameter of the cylinder rings is hereby selected greater than that of the central longitudinal shaft, with the outer surface areas of the cylinder rings serving as guides in a receptacle of the housing, and with the cylinder rings having control edges which serve to adjust the flow-through cross sections or for clearing or closing control channels, which feed into the receptacle and are fluidly connected to the displacement unit.

As the control piston and the housing have different coefficients of thermal expansion, the known lubricant pumps have the drawback that a precise interaction between the control edges and the control channels feeding into the receptacle cannot always be ensured over a wide operating temperature range, as encountered for example in combustion engines, so that the (axial) position of the second gear wheel does not always correspond to the desired position.

SUMMARY OF THE INVENTION

The invention is therefore based on the object to provide a lubricant pump and a control piston to ensure over a great operating temperature range, a reliable clearing and closing of the control channels, and thus an accurate adjustment of the feed volume by means of the control piston.

According to one aspect of the present invention, a lubricant pump includes a housing in which at least one pair of intermeshing gear wheels is arranged for conveying lubricant, with a first of the gear wheels being rotatably supported on a drive shaft and the second of the gear wheels being rotatably supported on an axially shiftable displacement unit for adjusting a variable flow volume, and a control piston axially displaceable in a receptacle of the housing for hydraulically adjusting the position of the displacement unit, with the control piston having a central longitudinal shaft and cylinder rings which include control edges for clearing or closing control channels feeding into the receptacle, wherein the control piston is configured as a composite structural part, with the cylinder rings of the control piston being made from a material which reduces friction and/or wear with respect to the receptacle, and with the central longitudinal shaft having at least one section made from a material having a coefficient of thermal expansion which at least substantially corresponds to the one of the receptacle. Provision is thus made for a control piston which is assembled of several individual parts. This multi-part construction is optimized through the advantageous material selection of the individual parts to ensure an exact adjustment of the flow rate at any time and at any operating temperature point. The cylinder rings guided in the receptacle are hereby made of a material which, in combination or in interaction with the material of the receptacle or the housing causes little friction. This ensures that the control piston can easily be moved at any time into the receptacle in order to adjust the desired flow-through cross sections for the control channels. The central longitudinal shaft, i.e. at least the sections of the control piston between the cylinder rings, is made at least in some sections of a material having a thermal coefficient which corresponds at least substantially to the one of the housing, so that the control piston and the receptacle undergo substantially same (axial) length variation, when the temperature changes. As a result, the control piston jointly grows so to speak with the receptacle of the housing when the temperature increases. This ensures that the control edges of the control piston with the associated control channels—depending on the position/location of the control piston—interact with one another in a same manner at all times. According to a refinement of the invention, it is conceivable to select the material of the central longitudinal shaft at least in one section such that the coefficient of thermal expansion exceeds the one of the housing in order to compensate the possibly smaller coefficient of thermal expansion of the cylinder rings.

Preferably, the central longitudinal shaft has at least one section which is made from the material of the housing. The central longitudinal shaft is thus at least in part made from the material of the receptacle which supports the control piston. As a result, the coefficient of thermal expansion of the longitudinal shaft corresponds, at least in the corresponding section, precisely to the one of the housing, so that—when the control piston is not in motion—the distance from the control edges to the respective ports of the control channels remain the same even when the temperature fluctuations are greater.

Preferably, the cylinder rings are made of plastic. The plastic cylinder rings provide reduced friction between the control piston and the receptacle of the typically metallic housing.

Preferably, the housing is made at least substantially of aluminum or magnesium. As a result, a light lubricant pump is created, with the cylinder rings of plastic being movable with little friction in the receptacle which is then also made of aluminum or magnesium. Furthermore, the advantageous material combination of cylinder rings and receptacle or housing forms a protection against wear or permits a wear-resistant operation so as to ensure a long life of the lubricant pump or a combustion engine which includes the lubricant pump.

According to another aspect of the present invention, the control piston is characterized by a construction as a composite structural part, with the cylinder rings being made of plastic, and with the central longitudinal shaft having at least one section which is made substantially of aluminum or magnesium, in particular as described above. As a result, a wear-resistant control piston is created which is particularly suitable for use in lubricant pumps which have a metal housing, in particular of magnesium or aluminum. As sections of the longitudinal shaft are made of aluminum or magnesium, the control piston exhibits an advantageous thermal expansion behavior so that the control piston grows or shrinks at least substantially in accordance with a control-piston-supporting receptacle of the housing of the lubricant pump, when the temperature changes, so that desired flow-through cross sections of control channels which feed into the receptacle can be adjusted at all times by means of the control piston.

BRIEF DESCRIPTION OF THE DRAWING

The invention will now be described in greater detail with reference to the drawing. It is shown in.

DETAILED DESCRIPTION OF PREFERRED EMBODIMENTS

Figure 1:
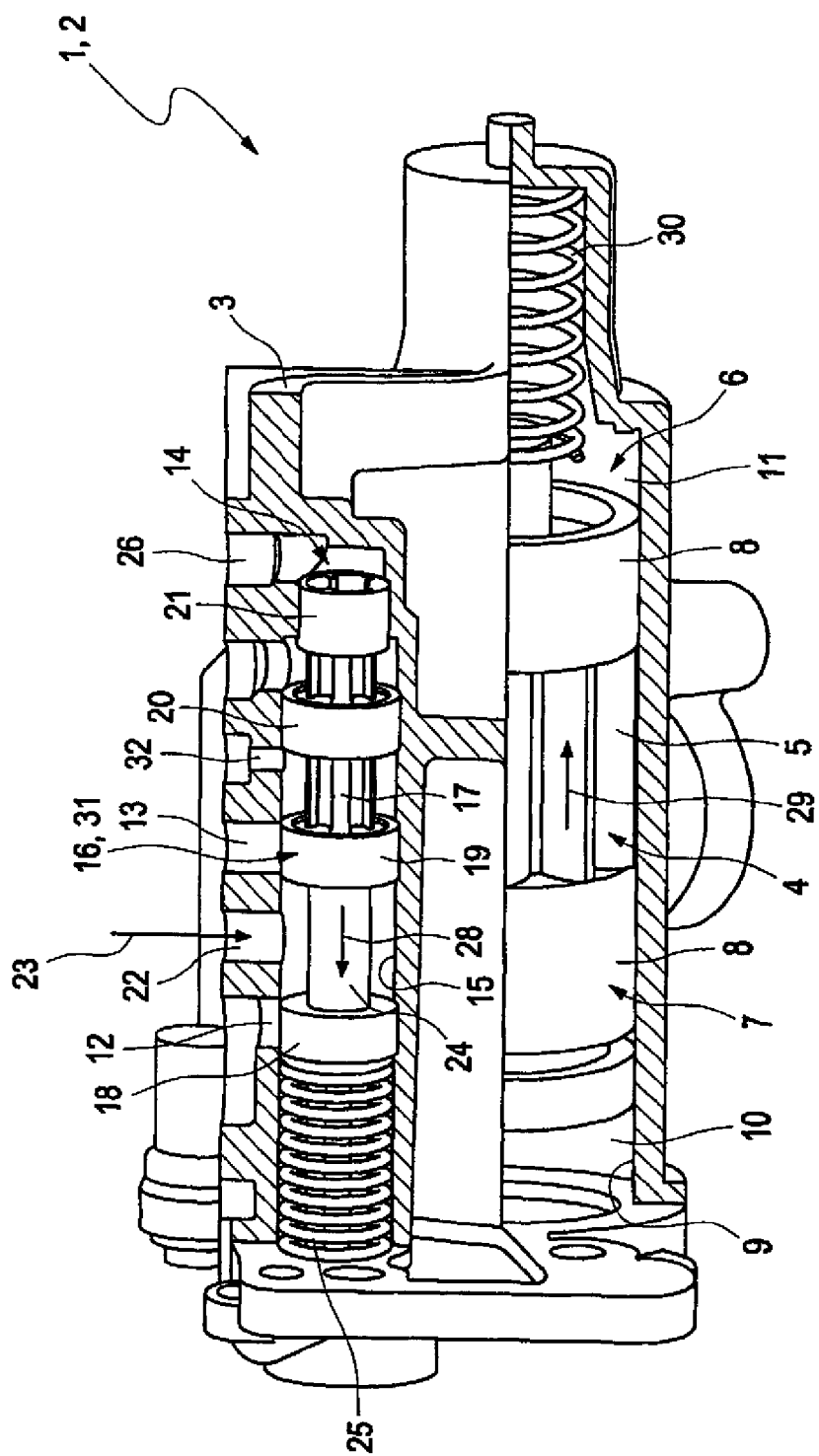
FIG. 1 a perspective sectional view of a lubricant pump,
FIG. 2 a perspective view of a control piston of the lubricant pump.

FIG. 1 shows a perspective sectional view of a lubricant pump 1 for the combustion engine of a motor vehicle. The lubrication pump 1 is designed as a variable capacity oil pump 2 and has for this purpose a housing 3 which is made at least substantially of aluminum or magnesium and in which a pair 4 of meshing gear wheels 5 are arranged. The gear wheels 5 convey a lubricant to the gear wheel pumps in a known manner. One of the gear wheels is hereby fixedly mounted on a drive shaft, whereas the other—visible here—gear wheel 5 is rotatably mounted on an axially shiftable displacement unit 6 and driven by the first gear wheel.

The displacement unit 6 substantially includes a piston 7, which has two spaced-apart cylinder rings 8. The gear wheel 5 is held in an axially form-fitting manner between the cylinder rings 8. The cylinder rings 8 are movably supported with their outer surface area in a cylindrical pump receptacle 9 of the housing 3 in a sliding manner. The pump receptacle 9 is configured (axially) longer than the displacement unit 6 so that pressure chambers 10 and 11 are formed on both sides of the displacement unit 6 The pressure chambers 10, 11 are fluidly connected with a control unit 14 of the lubricant pump 1 via control channels 12 and 13, respectively. A helical spring 30 is arranged in the pressure chamber 11 to provide a dampening axial stop for the displacement unit 6.

Figure 2:
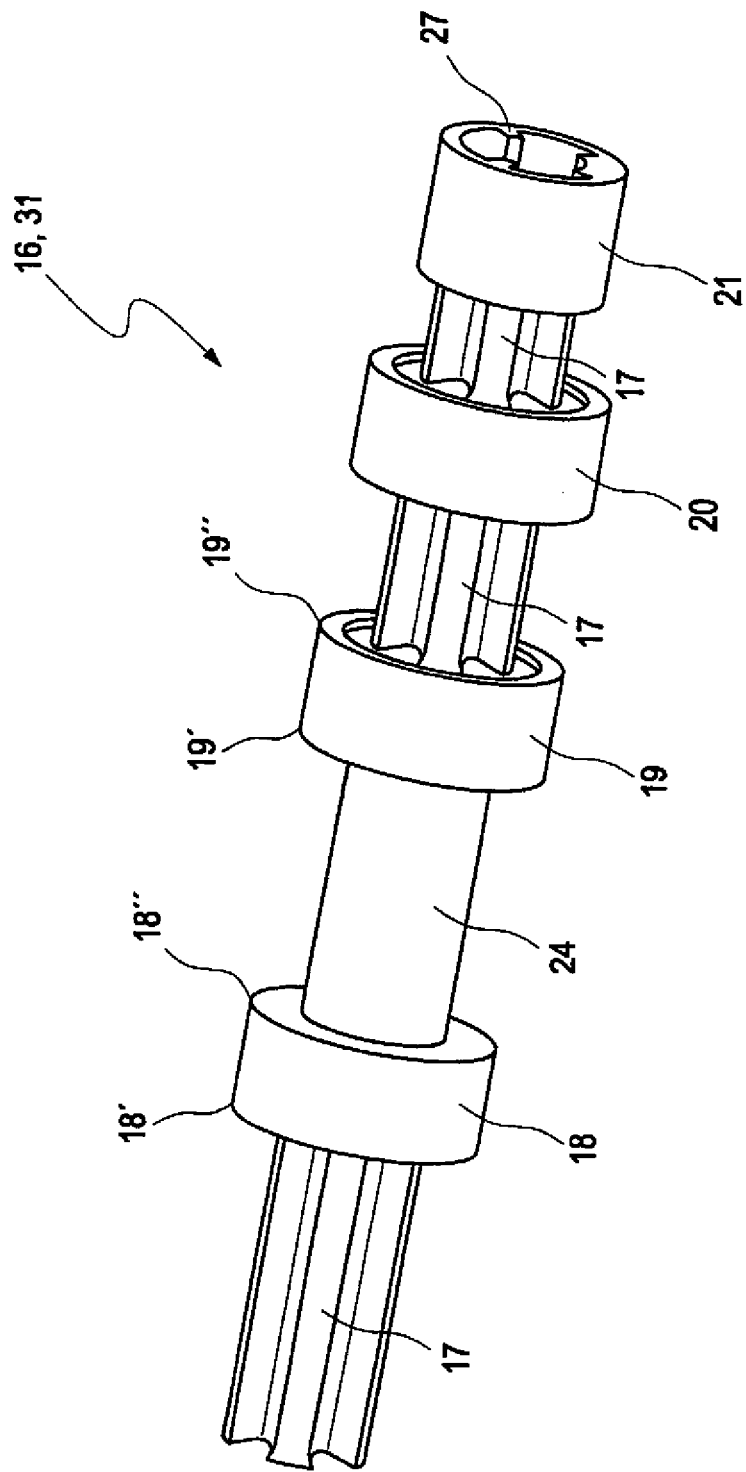

The control unit 14 essentially includes a cylindrical receptacle 15 in which a control piston 16 is arranged for longitudinal movement or axial displacement. The control piston 16, which is shown in FIG. 2 by way of an enlarged perspective view, has a central longitudinal shaft 17 and four cylinder rings 18, 19, 20 and 21, whose outer diameters are each greater than the outer diameter of the central longitudinal shaft 17. The outer surface areas of the cylinder rings 18 to 21 interact with the inner side of the receptacle 15 as thrust sliding bearing for the control piston 16. Each of the cylinder rings 18 to 21 is axially bounded by two control edges, of which, for ease of illustration, only the control edges 18', 18" and 19', 19" of the cylinder rings 18 and 19 are labeled with reference numerals. The thus bounded outer surface areas of the cylinder rings 18 to 21 interact with the control channels or their ports in the receptacle 15 in such a way that a displacement of the control piston 16 closes or clears the control channels 12 and 13. In the illustrated neutral position of the control piston 16, both control channels 12 and 13 are closed. Feeding into the receptacle 15 next to the control channels 12 and 13 is in addition a main channel 22 through which pressurized hydraulic medium, such as for example oil or other lubricant, flows into the receptacle 15 or control unit 14, as indicated by arrow 23. According to the present embodiment, further optional control channels feed into the receptacle 15 and can be used for further functions.

The control piston 16 is designed as a composite structural part 31 and thus includes several individual parts. In the present embodiment, the section 24 of the longitudinal shaft 17 between the cylinder rings 18 and 19 is made of a different material than the remainder of the control piston 16. While at least the cylinder rings 18 to 21 are made of plastic, the section 24 is made from the material of the housing 3, i.e. of aluminum or magnesium. As a result, the section 24 has the same coefficient of thermal expansion as the housing 3. According to a further, not shown, refinement, the sections between the cylinder rings 19 and 20 and/or 20 and 21 are made preferably also of the material of the housing.

In the neutral state, as shown in FIG. 1, the control piston is movable against a helical spring 25 which is held between the housing 3 and the free end face of the cylinder ring 18. For that purpose, the free end face 27 of the cylinder ring 21 is acted upon by hydraulic pressure via a channel 26 for example so that the control piston is moved against the spring element 25 in the direction of arrow 28. As a result, the control channels 12 and 13 are cleared so that hydraulic medium supplied through the channel 22 is conveyed through the channel 12 into the pressure chamber 10, and hydraulic medium contained in the pressure chamber 11 escapes through the channel 13 and a vent channel 32 feeding into the receptacle, with the pressure differential in the pressure chambers 10 and 11 causing a shift of the displacement unit 6 in the direction of arrow 29.

As a result of the advantageous configuration of the control piston 16, temperature fluctuations affect the housing 3 and the control piston 16 in a same way, with the cylinder rings 18 and 21 being always spaced from one another at the same distance as the ports of the channels 12 and 13. This therefore ensures that the two pairs of control edges 18', 18" and 19', 19" are spaced from one another over the entire operating temperature range of the lubricant pump 1 at a same distance as the distance between the two ports of the channels 12 and 13. The control piston 16 grows, so to speak, with the housing 3 when the temperature increases so as to ensure a reliable closing and clearing of the control channels 12 and 13 at all times and thus to continuously ensure a reliable positioning of the displacement unit and reliable adjustment of the desired flow rate of the lubricant pump 1.

The invention claimed is:
1. A lubricant pump, comprising:
a housing having a receptacle and composed of a first material;
at least one pair of intermeshing gear wheels arranged in the housing for conveying lubricant with a first one of the gear wheels being rotatably supported on a drive shaft and a second one of the gear wheels being rotatably supported on an axially shiftable displacement unit for adjusting a variable flow volume; and a control piston axially displaceable in the receptacle of the housing for hydraulically adjusting a position of the displacement unit, said control piston being configured as a composite structural part and having a longitudinal shaft which has a plurality of sections made of the first material of which the housing is composed, said control piston including a plurality of pairs of cylinder rings supported on the longitudinal shaft and made from a second material which is different from the material of the housing and of the sections of the longitudinal shaft and which reduces friction and/or wear with respect to the housing, wherein the cylinder rings are spaced from one another in a longitudinal direction, and each of the sections of the longitudinal shaft extends between two cylinder rings of a respective one of the pairs of the cylinder rings.

2. The lubricant pump of claim 1 for use in a combustion engine of a motor vehicle.

3. The lubricant pump of claim 1, wherein the second material of the cylinder rings is plastic.

4. The lubricant pump of claim 1, wherein the first material of the housing and of the sections of the longitudinal shaft is at least substantially aluminum or magnesium.

* * * * *